US012679129B2

(12) United States Patent　　(10) Patent No.:　US 12,679,129 B2
Ito　　(45) Date of Patent:　　Jul. 14, 2026

(54) IMAGE FORMING METHOD AND IMAGE FORMING SYSTEM

(71) Applicant: BROTHER KOGYO KABUSHIKI KAISHA, Nagoya (JP)

(72) Inventor: Shinpei Ito, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 248 days.

(21) Appl. No.: 18/426,458

(22) Filed: Jan. 30, 2024

(65) Prior Publication Data

US 2024/0253380 A1　　Aug. 1, 2024

(30) Foreign Application Priority Data

Jan. 31, 2023　(JP) ................................ 2023-013616

(51) Int. Cl.
　　*B41M 5/00*　　　(2006.01)
　　*B41J 2/21*　　　(2006.01)
　　　　　　(Continued)
(52) U.S. Cl.
　　CPC .......... *B41M 5/0011* (2013.01); *B41J 2/2117* (2013.01); *B41J 3/4078* (2013.01);
　　　　　　(Continued)
(58) Field of Classification Search
　　CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623;
(Continued)

(56) References Cited

U.S. PATENT DOCUMENTS 6,336,721 B1 * 1/2002 Provost .................. C09D 11/40
　　　　　　　　　　　　　　　　347/100
2007/0197684 A1　8/2007 Yamashita et al.
(Continued)

FOREIGN PATENT DOCUMENTS

EP　　　　3421553 A1　　1/2019
JP　　2007223112 A　　9/2007
(Continued)

OTHER PUBLICATIONS

Extended European Search Report issued Nov. 8, 2024, in corresponding European Patent Application No. 24154699.3, 10 pages.

*Primary Examiner* — Manish S Shah
(74) *Attorney, Agent, or Firm* — Element IP, PLC

(57)　　　　　　ABSTRACT

An image forming method includes: applying a pretreatment liquid, which is an aqueous solution, to a cloth material; heating the applied pretreatment liquid; and applying an ink onto the cloth material, after heating, to form an image on the cloth material by an ink jet method. After heating, the cloth material includes the pretreatment liquid and an amount of the pretreatment liquid per unit area of the cloth material is less than 30 mg/cm$^2$. The ink includes a white ink containing titanium oxide particles having an average particle diameter of more than 10 nm and 200 nm or less.

15 Claims, 5 Drawing Sheets

(51) Int. Cl.

| | |
|---|---|
| *B41J 3/407* | (2006.01) |
| *B41M 3/00* | (2006.01) |
| *C09D 11/037* | (2014.01) |
| *C09D 11/322* | (2014.01) |
| *C09D 11/38* | (2014.01) |
| *C09D 11/54* | (2014.01) |
| *D06P 1/673* | (2006.01) |
| *D06P 5/00* | (2006.01) |
| *D06P 5/20* | (2006.01) |
| *D06P 5/30* | (2006.01) |

(52) U.S. Cl.
CPC .......... *B41M 3/008* (2013.01); *B41M 5/0047* (2013.01); *C09D 11/037* (2013.01); *C09D 11/322* (2013.01); *C09D 11/38* (2013.01); *C09D 11/54* (2013.01); *D06P 1/6735* (2013.01); *D06P 5/002* (2013.01); *D06P 5/2072* (2013.01); *D06P 5/30* (2013.01)

(58) Field of Classification Search
CPC ............... B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 2009/0081423 A1* | 3/2009 | Sano ........................ | B41J 15/04 |
| | | | 427/210 |
| 2013/0135382 A1* | 5/2013 | Mitsuzawa .......... | C09D 133/08 |
| | | | 524/565 |
| 2015/0054885 A1* | 2/2015 | Sugiyama ............... | D06P 1/525 |
| | | | 347/21 |
| 2015/0111989 A1* | 4/2015 | Kagata ................... | C09D 11/40 |
| | | | 523/218 |
| 2015/0239261 A1* | 8/2015 | Sugiyama ................ | C08K 3/16 |
| | | | 524/400 |
| 2018/0100078 A1* | 4/2018 | Kasperchik ........... | C09C 1/3661 |
| 2019/0100047 A1* | 4/2019 | Tamaki ................... | B05B 12/00 |
| 2019/0194482 A1* | 6/2019 | Yamazaki ............ | C01G 23/047 |
| 2020/0040523 A1 | 2/2020 | Miyasa et al. | |
| 2020/0087527 A1* | 3/2020 | Okuda ................. | B41J 2/2107 |
| 2020/0131394 A1* | 4/2020 | Fujii .................... | B41M 5/0017 |
| 2021/0129568 A1* | 5/2021 | Miyasa ............... | B41M 5/0023 |
| 2021/0291551 A1* | 9/2021 | Mataki ................. | B41M 5/0017 |
| 2021/0371687 A1* | 12/2021 | Ishida ................... | B41J 11/002 |
| 2022/0041883 A1* | 2/2022 | Guo ........................ | D06P 1/44 |
| 2022/0325119 A1* | 10/2022 | Miyasa ............... | C09D 11/322 |
| 2023/0137276 A1* | 5/2023 | Guo .......................... | D06P 1/44 |
| | | | 8/445 |
| 2024/0253362 A1* | 8/2024 | Kawakami ............. | D06P 1/653 |
| 2024/0254358 A1* | 8/2024 | Otani ..................... | D06P 1/673 |

FOREIGN PATENT DOCUMENTS

| | | |
|---|---|---|
| JP | 2020019173 A | 2/2020 |
| JP | 7155564 B2 | 10/2022 |
| WO | WO-2021247037 A1 | 12/2021 |

* cited by examiner

EVALUATION AA
THERE ARE NO CRACKS
(VISUAL OBSERVATION
·MICROSCOPE)

EVALUATION A
THERE ARE NO CRACKS
(VISUAL OBSERVATION)

EVALUATION B
THERE ARE CRACKS
(VISUAL OBSERVATION)

EVALUATION C
CRACKS ARE EXCESSIVE
(VISUAL OBSERVATION)

IMAGE FORMING METHOD AND IMAGE FORMING SYSTEM

REFERENCE TO RELATED APPLICATIONS

This application claims priority from Japanese Patent Application No. 2023-013616 filed on Jan. 31, 2023. The entire content of the priority application is incorporated herein by reference.

BACKGROUND ART

From the related art, a method for forming an image on a cloth material by an ink jet method has been studied. Typically, for example, there has been a garment printer, which is an image forming apparatus that directly forms an image on a garment by an ink jet method or an image forming method called direct to garment (DTG) or the like.

In many ink jet type image forming methods, paper is assumed as a base material, but even when the base material is a cloth material, there is no large difference in an image forming principle. However, in the case in which the base material is the cloth material, an ink discharged by the ink jet method at the time of image formation generally penetrates into the cloth material in a thickness direction. Therefore, before the image formation, a pretreatment liquid is generally applied to the cloth material, that is, a pretreatment step is performed.

SUMMARY

An image forming method according to an aspect of the present disclosure includes: applying a pretreatment liquid, which is an aqueous solution, to a cloth material; heating the applied pretreatment liquid; and applying an ink onto the cloth material, after heating, to form an image on the cloth material by an ink jet method. After heating, the cloth material comprises the pretreatment liquid and an amount of the pretreatment liquid per unit area of the cloth material is less than 30 mg/cm². The ink includes a white ink containing titanium oxide particles having an average particle diameter of more than 10 nm and 200 nm or less.

An image forming system according to another aspect of the present disclosure includes: a pretreatment liquid application unit configured to apply a pretreatment liquid, which is an aqueous solution, to a cloth material; a heating unit configured to heat the applied pretreatment liquid; and an image forming unit configured to apply an ink onto the cloth material to form an image on the cloth material by an ink jet method. The ink includes a white ink containing titanium oxide particles having an average particle diameter of 10 nm or more and 200 nm or less. The heating unit is configured to heat the pretreatment liquid such that the cloth material comprises the pretreatment liquid and an amount of the pretreatment liquid per unit area of the cloth material is less than 30 mg/cm²ial, after the heating unit heats pretreatment liquid.

A cloth material according to a further aspect of the present disclosure has an image formed thereon by the above-described image forming method.

BRIEF DESCRIPTION OF DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION

Figure 1:
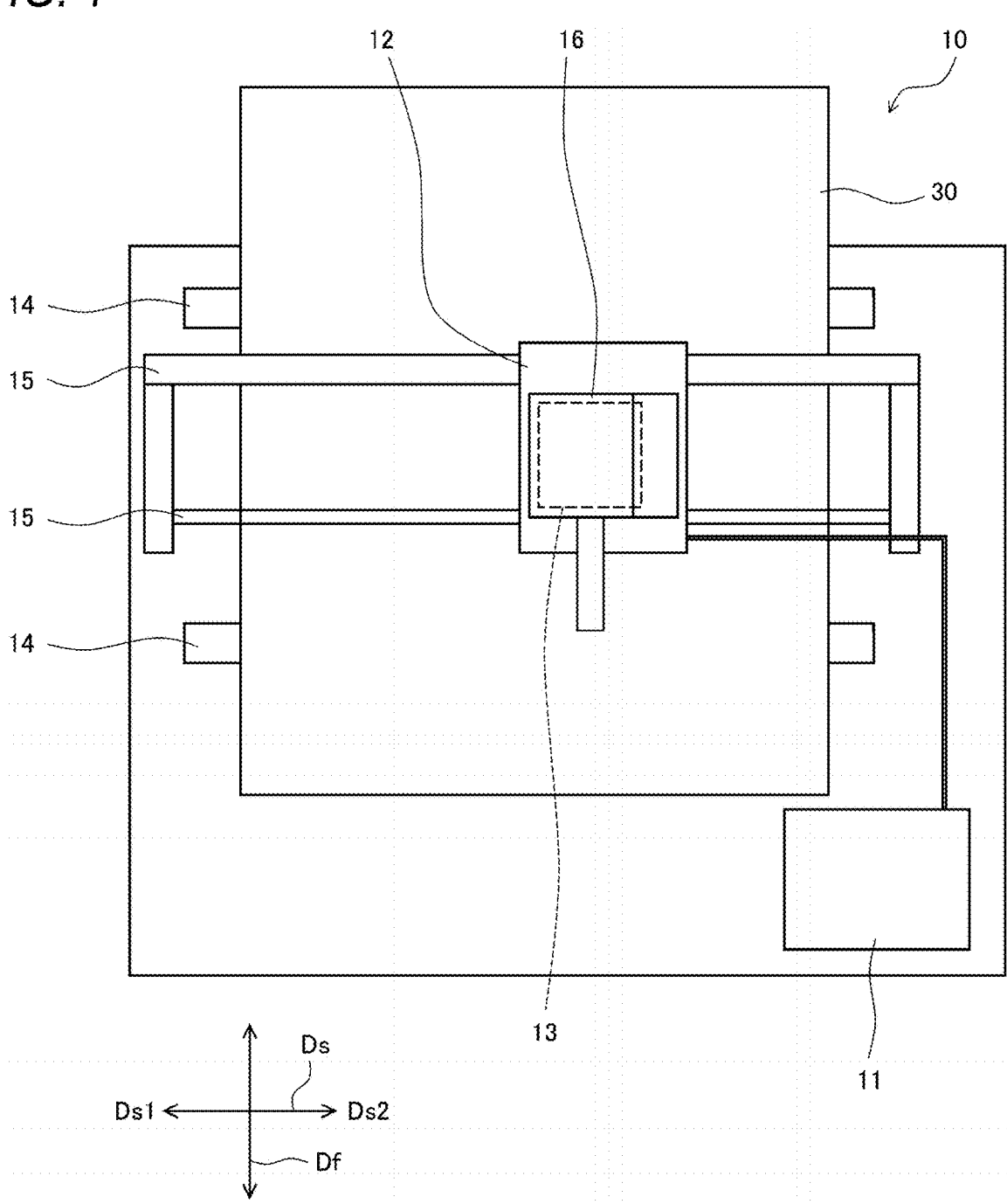
FIG. 1 is a schematic plan view showing a schematic configuration of an ink jet type image forming apparatus used in an image forming method according to a representative embodiment of the present disclosure.

As used herein, the words "a" and "an" and the like carry the meaning of "one or more." When an amount, concentration, or other value or parameter is given as a range, and/or its description includes a list of upper and lower values, this is to be understood as specifically disclosing all integers and fractions within the given range, and all ranges formed from any pair of any upper and lower values, regardless of whether subranges are separately disclosed. Where a range of numerical values is recited herein, unless otherwise stated, the range is intended to include the endpoints thereof, as well as all integers and fractions within the range. As an example, a stated range of 1-10 fully describes and includes the independent subrange 3.4-7.2 as does the following list of values: 1, 4, 6, 10.

It is known that the higher a refractive index of a material of the white pigment, the higher the scattering intensity, and excellent whiteness is provided to a printed matter. Titanium oxide has an extremely high refractive index among many white pigments, and is also highly safe, and thus titanium oxide is used as the white pigment in a variety of fields. However, there is a problem that titanium oxide has large specific gravity and is easily precipitated. Therefore, in order to prevent the precipitation, a use of titanium oxide having a small particle diameter as a white ink is being considered.

For example, it is considered that a white ink is prepared using titanium oxide particles having an average particle diameter of 250 nm, but it is also considered to use titanium oxide particles having a smaller average particle diameter, for example, 200 nm or less as a white pigment.

Here, it has been found that when a particle diameter of the titanium oxide particles, which are the white pigment, is made smaller, a quality of a formed white image tends to deteriorate. Specifically, as will be described later, a white ink using titanium oxide particles having an average particle diameter of 200 nm or less can prevent precipitation of the titanium oxide particles, but there is a risk that good whiteness cannot be obtained in the formed white image.

According an embodiment of the present disclosure, an image forming method for forming an image on a cloth material, includes: a pretreatment liquid application step of applying an aqueous pretreatment liquid to the cloth material; a heating step of heating the applied pretreatment liquid; and an image forming step of forming the image by discharging an ink onto the cloth material by an ink jet method after the heating step, wherein after the heating step, the pretreatment liquid remains in the cloth material, and a residual amount of the pretreatment liquid is less than 30 mg/cm$^2$, and wherein the ink contains at least a white ink containing titanium oxide particles having an average particle diameter of more than 10 nm and 200 nm or less.

According to another embodiment of the present disclosure, an image forming system, includes: a pretreatment liquid application unit configured to apply an aqueous pretreatment liquid to a cloth material; a heating unit configured to heat the applied pretreatment liquid; and an image forming unit configured to form an image by discharging an ink onto the cloth material by an ink jet method after the heating performed by the heating unit. The ink contains at least a white ink containing titanium oxide particles having an average particle diameter of 10 nm or more and 200 nm or less. The heating unit heats the cloth material such that a residual amount of the pretreatment liquid in the cloth material after the heating is less than 30 mg/cm$^2$.

It is generally known that titanium oxide particles have high specific gravity, and thus precipitate over time in the white ink. According to the configuration disclosed herein, however, a precipitation speed can be slowed down by reducing the average particle diameter. Accordingly, it is possible to prevent a discharge failure of an ink head.

Further, before the image is formed with the white ink, the pretreatment liquid is not sufficiently evaporated and is intentionally left to be less than 30 mg/cm$^2$. In this state, when the white ink is discharged onto the cloth material which is an absorbent base material, the titanium oxide particles which are a pigment component of the white ink can be prevented or avoided from penetrating into the cloth material in the thickness direction, and good whiteness can be achieved. Moreover, it is possible to effectively prevent or avoid an occurrence of a crack in the white image formed after the pretreatment liquid is applied.

Hereinafter, a representative embodiment of the present disclosure will be described with reference to the drawings. Hereinafter, the same or corresponding elements are denoted by the same reference numerals in all the drawings, and a repeated description thereof is omitted.

[Example of Ink Jet Type Image Formation]

A specific configuration of an ink jet type image forming apparatus used in an image forming method according to the present disclosure is not particularly limited. Examples of a representative image forming apparatus include an ink jet type garment printer shown in FIG. 1, and ink jet type image formation will be described.

As shown in FIG. 1, an ink jet type garment printer 10 according to the present embodiment discharges at least an ink onto a cloth material that is a base material, and includes a storage tank 11, a carriage 12, a discharge head 13, a pair of conveying rollers 14, a pair of guide rails 15, and sub-tanks 16. A cloth material 30 is placed on a platen (not shown) in the garment printer 10 as a base material (printing medium) on which an image is formed (printed).

The discharge head 13 indicated by a broken line in FIG. 1 is mounted on the carriage 12. The carriage 12 is supported by the pair of guide rails 15 extending in a movement direction Ds orthogonal to a conveyance direction Df of the cloth material 30, and reciprocates in the movement direction Ds along the guide rails 15. Accordingly, the discharge head 13 reciprocates in the movement direction Ds.

A control device of the garment printer 10 moves the carriage 12 at a predetermined speed while causing the discharge head 13 to discharge ink droplets. Further, a plurality of sub-tanks 16 are mounted on the carriage 12.

Each of the sub-tanks 16 is connected to the corresponding storage tank 11 via a tube (ink flow path). In FIG. 1, for convenience of illustration, the sub-tank 16 is schematically shown as a single structure.

The pair of conveying rollers 14 are arranged parallel to each other along the movement direction Ds. The conveying roller 14 is rotated by a drive of a conveyance motor, whereby the cloth material 30 on the platen is conveyed in the conveyance direction Df.

The ink is stored in the storage tank 11. The storage tank 11 is connected to the discharge head 13 via the sub-tank 16 and a tube. Further, the storage tank 11 is provided for each type of ink. In FIG. 1, for convenience of illustration, the storage tank 11 is schematically illustrated as a single structure like the sub-tank 16, and in the present embodiment, for example, five storage tanks 11 are present. Specifically, there are five tanks that store inks of respective colors, that is, a white ink, a black ink, a yellow ink, a cyan ink, and a magenta ink.

Figure 2:
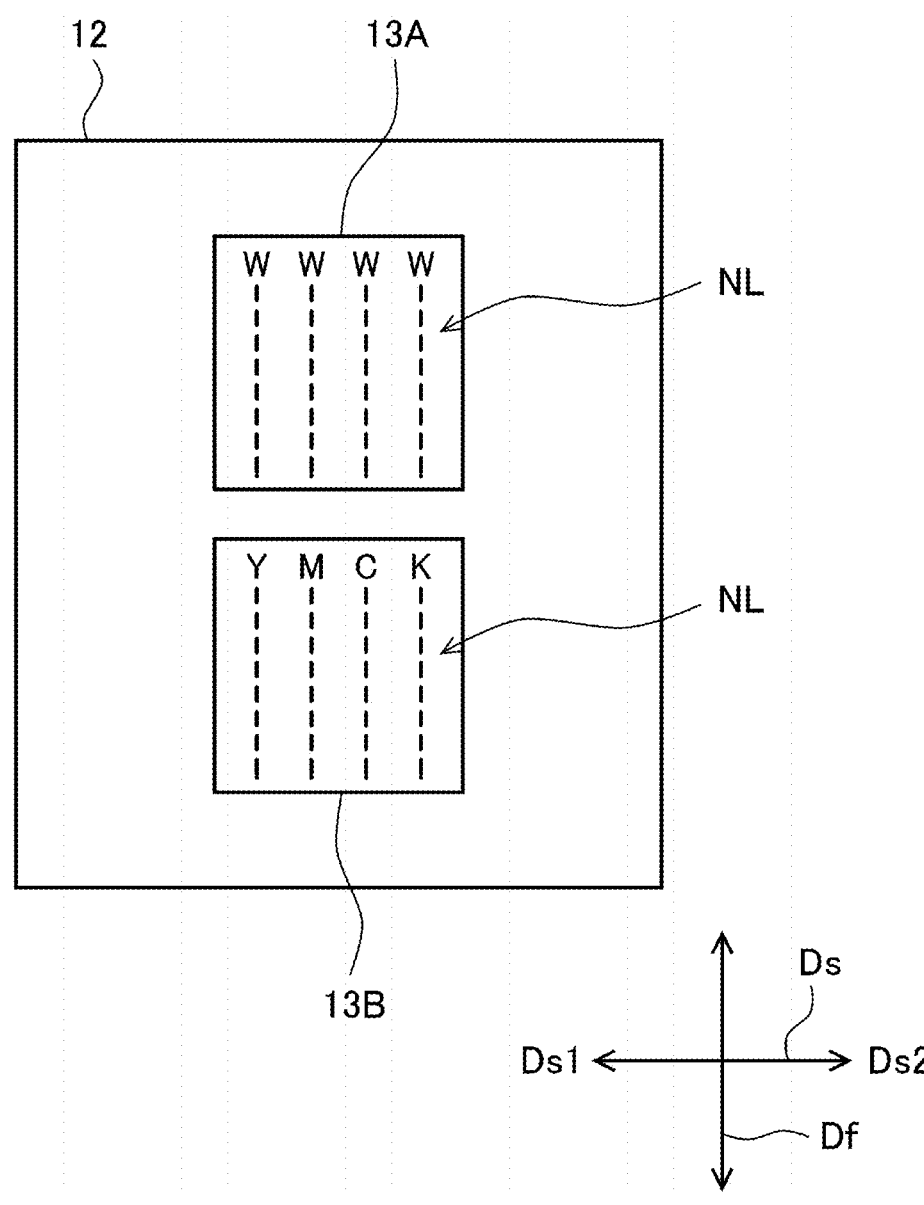
FIG. 2 is a schematic plan view showing a schematic configuration of a discharge head mounted on a carriage of the image forming apparatus shown in FIG. 1.

In the present embodiment, for example, as shown in FIG. 2, two discharge heads, that is, 13A and 13B are mounted on the carriage 12. The discharge head 13A and the discharge head 13B are arranged along the conveyance direction Df. The discharge head 13B is disposed, for example, in front of the discharge head 13A. During a first scan in an image forming process, the carriage 12 moves to the right in the movement direction Ds (or to the other direction Ds2 in the movement direction Ds).

Accordingly, the discharge heads 13A and 13B move to the right during the image forming process. In this case, the discharge head 13 discharges the ink droplets onto the cloth material 30 while moving to the right in the movement direction Ds. In the image forming process, an operation of conveying the cloth material 30 in the conveyance direction Df and an operation of discharging the ink droplets while moving the discharge head accordingly are alternately repeated.

The discharge head 13A discharges ink droplets of the white ink (W). In the discharge head 13A, nozzle rows NL that discharge the ink droplets of the white ink are formed along the conveyance direction Df. In an example shown in FIG. 2, four nozzle rows NL that discharge the ink droplets of the white ink are formed in the discharge head 13A at regular intervals in the movement direction Ds. The nozzle row NL that discharges the ink droplets of the white ink is not particularly limited, and may be, for example, two rows or one row.

On the other hand, the discharge head 13B discharges ink droplets of respective colors, that is, yellow (Y), magenta (M), cyan (C), and black (K), which are sometimes collectively referred to as a color ink. In the discharge head 13B, the nozzle rows NL that discharge respective ink droplets are formed along the conveyance direction Df. The nozzle rows NL are formed at regular intervals in the movement direction Ds.

In the example shown in FIG. 2, an arrangement order in the movement direction Ds of the nozzle rows NL in the discharge head 13B is, but not limited to, a nozzle row NL that discharges the yellow ink droplets, a nozzle row NL that discharges the magenta ink droplets, a nozzle row NL that discharges the cyan ink droplets, and a nozzle row NL that discharges the black ink droplets in the other direction Ds2 of the movement direction Ds.

In the present embodiment, a color image is printed on the cloth material 30 by discharging the ink droplets of these five colors onto the cloth material 30. In particular, in the present disclosure, when the color image is printed on the cloth material 30, in order to reduce an influence on a color of the cloth material 30 and a material of the cloth material 30, the white ink droplets are discharged first as a base ink, and a white image is formed first. The ink droplets of the color ink are discharged onto the white image formed on the cloth material 30.

In the image forming method according to the present disclosure, as will be described later, a pretreatment liquid is applied to the cloth material 30 as the base material before the white image is formed. By applying the pretreatment liquid to an image forming surface (printing surface) of the cloth material 30, it is possible to form a good image on the cloth material 30 by preventing, avoiding, or inhibiting a phenomenon such as penetration of the white ink or the color ink into the cloth material 30 and penetration of the inks into a joint or the like of the cloth material 30.

In the present embodiment, a specific configuration in which the pretreatment liquid is applied to the cloth material 30 is not particularly limited. For example, as shown in FIG. 3A, it is possible to adopt a configuration including a garment printer 10A and a pretreatment liquid application device 22.

Figure 3A:
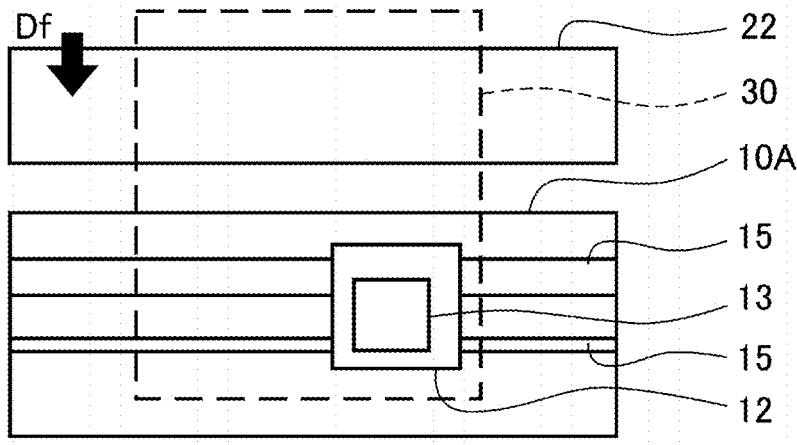
FIG. 3A to FIG. 3C are schematic plan views showing configuration examples in each of which a pretreatment liquid is applied before image formation performed by the image forming apparatus shown in FIG. 1.

The garment printer 10A has the same configuration as the garment printer 10 illustrated in FIG. 1, and only the carriage 12, the discharge head 13, and the guide rails 15 are schematically illustrated in FIG. 3A. Further, in FIG. 3A, the conveyance direction Df of the cloth material 30 is indicated by a black block arrow. As a configuration independent of the garment printer 10A, the pretreatment liquid application device 22 is located upstream in the conveyance direction Df as viewed from the garment printer 10A.

In FIG. 3A, the cloth material 30 is illustrated by a broken line, the cloth material 30 is first conveyed to the pretreatment liquid application device 22 along the conveyance direction Df, and the pretreatment liquid is applied to the image forming surface of the cloth material 30. Thereafter, the cloth material 30 is further conveyed along the conveyance direction Df and conveyed to the garment printer 10A, the white ink is further applied on the image forming surface to which the pretreatment liquid is applied to form the white image, and then a desired image is formed on the cloth material 30 by applying the color ink.

FIG. 3A is only a schematic diagram. In the example described above, the pretreatment liquid application device 22 and the garment printer 10A are located on the same conveyance path, and the application of the pretreatment liquid and the application of the white ink or the like are continuously performed on the cloth material 30, but the present disclosure is not limited thereto. For example, the pretreatment liquid application device 22 and the garment printer 10A may be independent liquid application devices. For example, an application step of the pretreatment liquid performed by the pretreatment liquid application device 22 and an application step of the white ink performed by the garment printer 10A may be continuous by sharing the conveyance path as described above, or may be performed as steps independent of each other.

A specific configuration of the pretreatment liquid application device 22 is not particularly limited, and a known application method can be suitably used. Specific examples of the application method include a spray coating method, a blade application method, a roll coating method, an ink jet method, and an immersion processing method (method of immersing the cloth material 30 in the pretreatment liquid and then squeezing the cloth material 30 with a mangle roll). From the viewpoint of continuously performing the application step of the pretreatment liquid and the application step of the white ink or the color ink, an ink jet method can also be adopted.

The application of the pretreatment liquid performed by the pretreatment liquid application device 22 may be performed on the entire image forming surface of the cloth material 30. Alternatively, depending on various conditions such as a size or a shape of the formed image, and a shape or a type of the cloth material 30, the pretreatment liquid may be applied only to a region (region where the white ink or the color ink is applied) where the image is formed on the cloth material 30. In the former case, a spray coating method, a blade application method, a roll coating method, an immersion processing method, or the like can be suitably adopted. In the latter case, an ink jet method can be suitably adopted.

In the configuration example shown in FIG. 3A, although the garment printer 10A and the pretreatment liquid application device 22 are independent configurations, the present disclosure is not limited thereto, and the garment printer 10A and the pretreatment liquid application device 22 may be integrated.

Figure 3B:
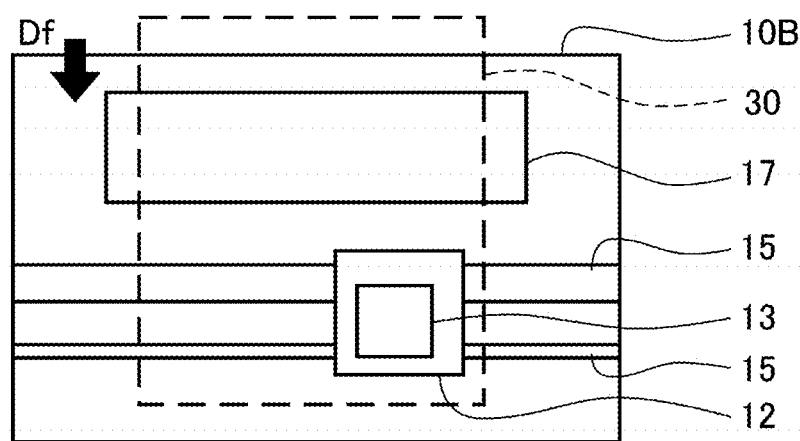

For example, as shown in FIG. 3B, a garment printer 10B includes an ink jet type image forming unit (storage tank 11, carriage 12, discharge head 13, guide rail 15, and the like) similarly to the garment printer 10 shown in FIG. 1 (or the garment printer 10A shown in FIG. 3A), and further includes a pretreatment liquid application unit 17.

When viewed from the carriage 12, the discharge head 13, the guide rail 15, and the like (image forming unit), the pretreatment liquid application unit 17 is located upstream in the conveyance direction Df (black block arrow in the figure) of the cloth material 30 (broken line in the figure), and is accommodated in a housing of the garment printer 10B. Therefore, in the garment printer 10B, the ink jet type image forming unit (ink application step) and the pretreatment liquid application unit 17 (pretreatment liquid application step) are integrated.

A specific configuration of the pretreatment liquid application unit 17 is not particularly limited, and may be any configuration as long as the pretreatment liquid application unit 17 can perform a known application method such as a spray coating method, a blade application method, a roll coating method, an ink jet method, or an immersion processing method, similarly to the pretreatment liquid application device 22 described above. For example, when the pretreatment liquid application device 22 is an ink jet type pretreatment liquid application device, the ink jet type pretreatment liquid application unit 17 that applies the pretreatment liquid is located upstream in the conveyance direction Df, and the ink jet type image forming unit that applies the white ink and the color ink is located downstream in the conveyance direction Df.

Figure 3C:
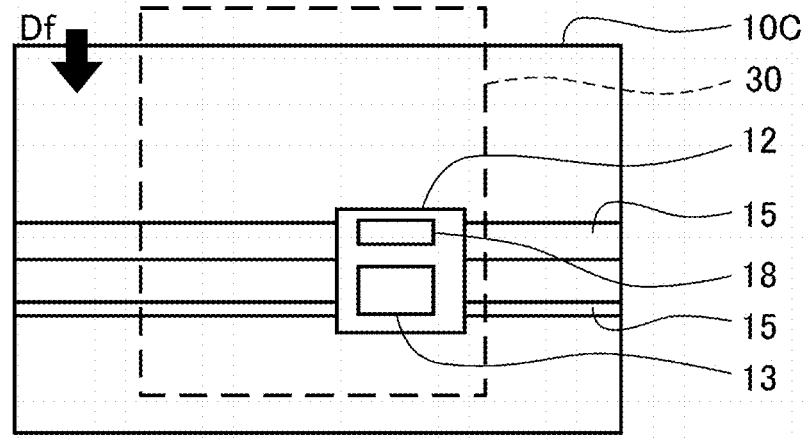

If the pretreatment liquid application step is performed by the ink jet method, as shown in FIG. 3C, a garment printer 10C may have a configuration in which the discharge head 13 for the ink application and a discharge head 18 for the pretreatment liquid application are provided in the carriage 12. In this case, in addition to the storage tank 11 for the ink, the sub-tank 16, and the tube connecting the storage tank 11 and the sub-tank 16, the storage tank 11 for the pretreatment liquid, the sub-tank 16, the tube, and the like may be provided. Alternatively, for example, when there is no discharge head 18, a part of the plurality of nozzle rows NL for the white ink provided in the discharge head 13A illustrated in FIG. 2 may be replaced with a nozzle row NL that discharges the pretreatment liquid.

In the image forming method according to the present disclosure, as will be described later, by heating at least the cloth material 30 to which the pretreatment liquid is applied, the pretreatment liquid is fixed to the image forming surface of the cloth material 30 (pretreatment liquid fixing process or heating process). Therefore, each of the pretreatment liquid application device 22 illustrated in FIG. 3A, the pretreatment liquid application unit 17 or the garment printer 10B illustrated in FIG. 3B, or the garment printer 10C illustrated in FIG. 3C may include a configuration that performs the pretreatment liquid fixing process on the cloth material 30, for example, a heating unit or a heating device. The heating unit or the heating device may be different from or the same as an image fixing unit or an image fixing device that heats and fixes an ink image such as a white image.

Figure 4A:
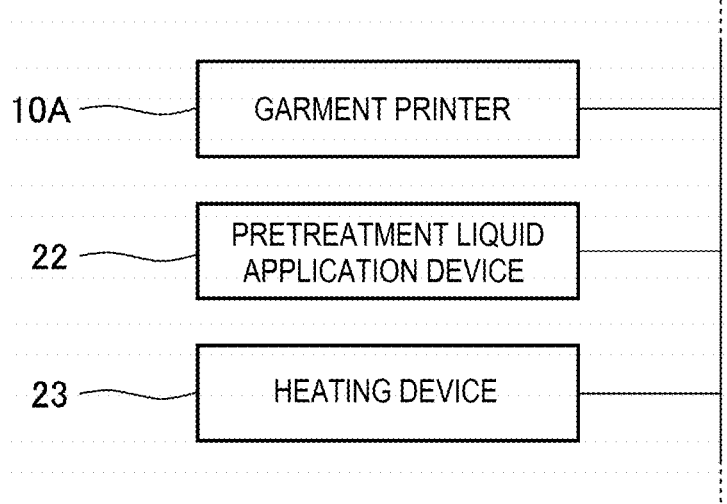
FIG. 4A to FIG. 4C are block diagrams showing control configuration examples of the image forming apparatus or an image forming system shown in FIG. 3A to FIG. 3C.

For example, when the garment printer 10A shown in FIG. 3A heats the cloth material to fix the pretreatment liquid applied before the image formation, as shown in a control configuration example in FIG. 4A, an independent heating device 23 that performs a pretreatment liquid fixing contraction process may form one image forming system via a network together with the garment printer 10A and the pretreatment liquid application device 22. In the image forming system, for example, the garment printer 10A may include a controller that controls an entire system, or may include independent control devices that respectively control the garment printer 10A, the pretreatment liquid application device 22, and the heating device 23.

Figure 4B:
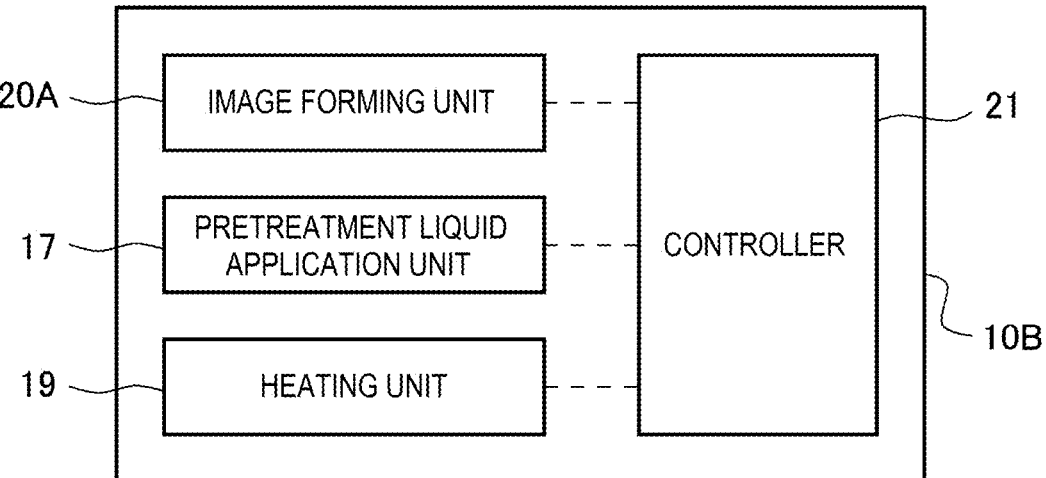

Alternatively, in the case of the garment printer 10B shown in FIG. 3B, as shown in FIG. 4B, the garment printer 10B may include an ink jet type image forming unit 20A, the pretreatment liquid application unit 17, and a heating unit 19. The image forming unit 20A, the pretreatment liquid application unit 17, and the heating unit 19 may be controlled by a controller 21 of the garment printer 10B.

Figure 4C:
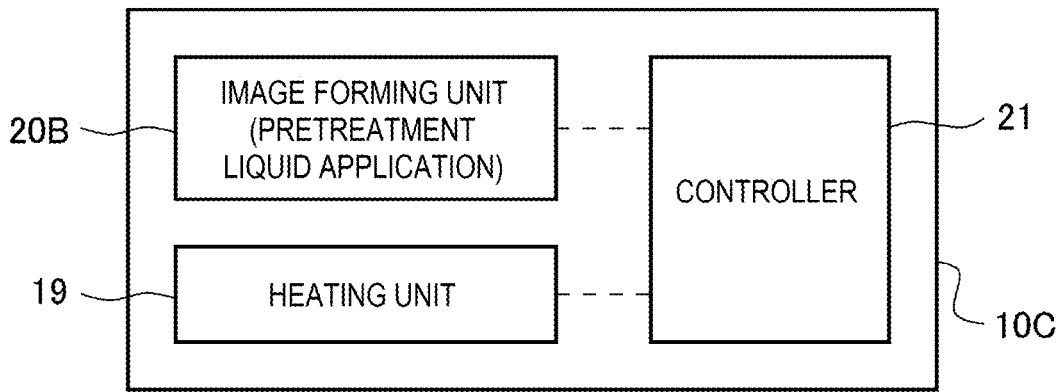

Alternatively, in case of the garment printer 10C shown in FIG. 3C, as shown in FIG. 4C, the garment printer 10C may include an image forming unit 20B capable of applying the pretreatment liquid and the heating unit 19. As described above, in the garment printer 10C, the carriage 12 includes the discharge head 13 for the ink application and the discharge head 18 for the pretreatment liquid application. The controller 21 of the garment printer 10C may be configured to control the discharge head 13 for the ink application, the discharge head 18 for the pretreatment liquid application, and the heating unit 19 in the image forming unit 20B.

A specific configuration of the heating unit 19 or the heating device 23 is not particularly limited, and a heat press device known in a textile printing field of the ink jet method can be suitably used. In a case in which the heating of the cloth material 30 performed by the heating unit 19 or the heating device 23 is accompanied by compression, a configuration (heating and compressing unit or heating and compressing device) capable of performing the heating and the compression as in a heat press device may be adopted, but a heating device and a compressing device may be separately provided.

When a known heat press device is used as the heating unit 19 or the heating device 23, there are the following advantages, for example. First, by pressing the cloth material 30, gaps between fibers of the cloth material 30 are closed and become difficult to penetrate. Accordingly, the pretreatment liquid or the white ink can easily remain on the cloth material 30 (image forming surface) as a medium.

By pressing the cloth material 30, it is possible to reduce concave and convex portions that affect the ease of cracking of the image. The concave and convex portions are caused by wrinkles or fluffing of the cloth material. When the ink is particularly applied to a convex portion among the concave and convex portions on the cloth material 30, there is a possibility that the ink "falls" along a surface of the convex portion toward a concave portion due to gravity. Accordingly, a concentration of the ink in the convex portion is lower than that in the concave portion. Therefore, if the cloth material 30 has many concave and convex portions, the concentration of the ink becomes non-uniform. Further, the ink applied to the cloth material 30 forms an ink film, and when the ink film is heated, shrinkage occurs. Here, when the concentration of the ink becomes non-uniform, the ink film, that is, the image is likely to be cracked.

Configuration examples obtained by appropriately combining configuration examples illustrated in FIGS. 4A to 4C are also included in the present disclosure. For example, a configuration in which the heating unit 19 is removed from the garment printer 10B shown in FIG. 4B or the garment printer 10C shown in FIG. 4C is added to a configuration in which the garment printer 10A and the pretreatment liquid application device 22 are removed from the image forming system shown in FIG. 4A. Alternatively, in the image forming system shown in FIG. 4A, the pretreatment liquid application device 22 and the heating unit 19 may be integrated.

Although not specifically shown in FIG. 1 or FIGS. 3A to 3C, the garment printers 10 and 10A to 10C may be provided with a configuration for performing a known post-processing in the field of forming the image on the cloth material 30. Alternatively, similarly to a combination of the garment printer 10A and the pretreatment liquid application device 22 shown in FIG. 3A, an independent configuration (post-processing device) for performing the post-processing may be used in combination.

[Pretreatment Liquid]

In the image forming method according to the present disclosure, as described above, the pretreatment liquid is applied to the image forming surface (printing surface) of the cloth material 30 before the white image is formed (printed) on the cloth material 30 with the white ink. A specific configuration of the pretreatment liquid used in the present disclosure is not particularly limited, and any liquid may be used as long as the liquid contains a compound that thickens or aggregates the white ink by interacting with components in the white ink.

The titanium oxide particles are fine powders (fine particles) and are not dissolved in a general solvent. Accordingly, the white ink is in a form of dispersion or suspension in which the titanium oxide particles are dispersed in a solvent. In order to cause such a white ink to hardly penetrate into the cloth material 30, a representative method is to aggregate the titanium oxide particles, which are a color material of the white ink.

Therefore, in the present embodiment, the compound that thickens or aggregates the white ink is referred to as an "aggregating agent" for convenience. In the present embodiment, the pretreatment liquid contains at least an aggregating agent having an action of aggregating the titanium oxide particles. The aggregating agent in the present disclosure is not limited to the compound that aggregates the titanium oxide particles, but may also be a compound that aggregates (or thickens or insolubilizes) other components contained in the white ink.

Specific examples of the aggregating agent include, but are not limited to, known acids, polymers, and metal salts.

In particular, in the present disclosure, a polyvalent metal salt is suitably used as the aggregating agent.

Examples of representative metal elements constituting the polyvalent metal salt include, but are not particularly limited to, metal elements in group 2 of the periodic table (alkaline earth metal), metal elements in group 3 of the periodic table (transition metals), metal elements of group 13 of the periodic table (earth metal), and lanthanoids.

Examples of an acid that forms a salt with such a metal element include organic acids such as saturated fatty acids, hydroxy acids, aromatic carboxylic acids, and dicarboxylic acids; and inorganic acids such as sulfuric acid, nitric acid, hydrochloric acid, sulfurous acid, nitrous acid, thiosulfuric acid, phosphoric acid, carbonic acid, and thiocyanic acid. As the organic acid, those having a relatively low molecular weight, such as formic acid, acetic acid, lactic acid, citric acid, and benzoic acid, are suitably used.

Specific examples of the polyvalent metal salt include calcium salts such as calcium chloride, calcium sulfate, calcium hydrogensulfate, calcium nitrate, calcium carbonate, calcium hydrogencarbonate, calcium phosphate, calcium sulfite, calcium nitrite, calcium acetate, calcium thiocyanate, calcium thiosulfate, calcium benzoate, and calcium lactate; and magnesium salts such as magnesium chloride, magnesium carbonate, magnesium nitrate, magnesium sulfate, magnesium sulfite, magnesium phosphate, magnesium acetate, magnesium benzoate, and magnesium citrate. Since the calcium salts or the magnesium salts are generally easily available and inexpensive, the calcium salts and the magnesium salts are suitable as the aggregating agent for the pretreatment liquid.

These polyvalent metal salts may be used alone or in an appropriate combination of two or more thereof. Further, these polyvalent metal salts may be hydrates. In Examples to be described later, calcium nitrate tetrahydrate ($Ca(NO_3)_2 \cdot 4H_2O$) is used as the polyvalent metal salt.

Examples of the acid used as the aggregating agent include known organic acids. Specific examples of the organic acid include, but are not particularly limited to, formic acid; saturated fatty acids such as acetic acid, propionic acid, butyric acid, and valeric acid; hydroxy acids such as lactic acid, malic acid, and citric acid; aromatic carboxylic acids such as benzoic acid, phthalic acid, isophthalic acid, terephthalic acid, salicylic acid, and gallic acid; dicarboxylic acids such as oxalic acid, malonic acid, succinic acid, and fumaric acid; uronic acids such as glucuronic acid, galacturonic acid, and iduronic acid; and ascorbic acid. These organic acids may be salts in which a cation is not a metal ion (for example, an ammonium salt or an amine salt). These organic acids may be used alone or in an appropriate combination of two or more thereof.

Alternatively, examples of a polymer used as the aggregating agent include salts obtained by reacting, with the acid, amine polymers such as polyallylamine, N-trimethylaminomethylpolystyrene, tetraethylenepentamine, polyamine sulfone, polyvinylamine, an amine-epichlorohydrin copolymer, and derivatives of these polymers, or polyethyleneimine. These polymers can also be classified as the cationic compound. In the present disclosure, as shown in Examples to be described later, the polyvalent metal salt is preferably used as the aggregating agent, but the above-described organic acid or polymer (or cationic compound) can also be used as the aggregating agent, and the organic acid or the polymer can be used in combination with the polyvalent metal salt.

Since the pretreatment liquid used in the present disclosure is aqueous, at least water is used as the solvent. The water used as the solvent may have relatively high purity. Generally, ion exchanged water, ultrafilter water, reverse osmosis water, distilled water, and the like can be used. The water having high purity may be pure water (electrical resistivity at 25° C. is about 0.1 MΩ·cm to 1.5 MΩ·cm) or ultrapure water (electrical resistivity at 25° C. is 10 MΩ·cm or more).

In the pretreatment liquid used in the present disclosure, a content of the aggregating agent is not particularly limited, but as a representative content, a lower limit of the content of the aggregating agent may be 0.01% by mass or more, may be 0.1% by mass or more, or may be 0.5% by mass or more, when a total amount of the pretreatment liquid containing the aggregating agent and the water is 100% by mass. An upper limit of the content of the aggregating agent may be 40% by mass or less, may be 20% by mass or less, or may be 5% by mass or less.

When the aggregating agent is the polyvalent metal salt, a content of the polyvalent metal salt may be limited in terms of a polyvalent metallic element. For example, when the polyvalent metal salt is various calcium salts described above, a lower limit of the content of the calcium salt in terms of calcium may be 0.01% by mass or more, may be 0.05% by mass or more, or may be 0.3% by mass or more when the total amount of the pretreatment liquid is 100% by mass. Further, an upper limit of the content of the calcium salt in terms of calcium may be 10% by mass or less, may be 5% by mass or less, or may be 3% by mass or less.

When the content of the aggregating agent is less than the lower limit value, a concentration of the aggregating agent in the pretreatment liquid becomes too low, and the components in the white ink to be applied later may not be satisfactorily aggregated. On the other hand, when the content of the aggregating agent exceeds the upper limit value, there is an influence that a crack is likely to occur in the formed white image.

The pretreatment liquid used in the present disclosure may contain an organic solvent other than water. By adding the organic solvent in the pretreatment liquid, for example, when the organic solvent is less likely to volatilize, a residual amount thereof after drying can be easily adjusted. A specific organic solvent is not particularly limited, and may be a water-soluble organic solvent since a main solvent is water.

Specific examples of the water-soluble organic solvent include lower alcohols such as ethanol, 1-propanol (n-propyl alcohol), 2-propanol (isopropyl alcohol, IPA), 1-butanol (n-butyl alcohol), 2-butanol (sec-butyl alcohol), 2-methyl-1-propanol (isobutyl alcohol), and 2-methyl-2-propanol (tert-butyl alcohol); polyhydric alcohols such as glycerol (glycerin), trimethylolpropane, and trimethylolethane; alkylene glycols such as ethylene glycol, propylene glycol, butylene glycol, diethylene glycol, triethylene glycol, dipropylene glycol, tripropylene glycol, thiodiglycol, and hexylene glycol, or polyethers; amides such as dimethylformamide, diethylformamide, dimethylacetamide, 2-pyrolidone, and N-methyl-2-pyrolidone; ketones such as acetone, methyl ethyl ketone, diethyl ketone, and cyclohexanone; ketoalcohols such as diacetone alcohol; ethers such as tetrahydrofuran and dioxane; and 1,3-dimethyl-2-imidazolidinone (DMI). These water-soluble organic solvents may be used alone or in an appropriate combination of two or more thereof. In Examples to be described below, glycerol (glycerin) is used as the solvent.

In the present disclosure, it is not essential to contain the organic solvent in the pretreatment liquid, and when the organic solvent is contained, a content thereof is not particularly limited. As a representative content, a lower limit of the content of the organic solvent may be 0% by mass or more, may be 4% by mass or more, or may be 8% by mass or more when the total amount of the pretreatment liquid containing the aggregating agent and the water as the main solvent is 100% by mass. An upper limit of the content of the organic solvent may be 40% by mass or less, may be 20% by mass or less, or may be 10% by mass or less.

The upper limit value or the lower limit value of these contents means a total amount of the organic solvent in the pretreatment liquid. That is, when the pretreatment liquid contains only one type of organic solvent, the upper limit value or the lower limit value is an upper limit value or a lower limit value of a content of the one type of organic solvent. When the pretreatment liquid contains two or more types of organic solvents, the upper limit value or the lower limit value is an upper limit value or a lower limit value of a total dose (total amount) of the two or more types of organic solvents.

The pretreatment liquid used in the present disclosure may further contain a thickening agent. By adding the thickening agent to the pretreatment liquid, the quality of the white image formed on the cloth material 30 to which the pretreatment liquid is applied can be further improved.

Specific examples of the thickening agent include polysaccharides such as pullulan, dextran, dextrin, cyclodextrin, carrageenan, pectin, glucomannan, alginic acid, xanthan gum, arabic gum, locust bean gum, gum tragacanth, guar gum, tamarind gum, and a starch; modified starches such as oxidized starch, carboxyl starch, and dialdehyde starch; alginates such as sodium alginate, potassium alginate, and ammonium alginate; alginate esters such as an alginate propylene glycol ester; cellulose such as methyl cellulose, ethyl cellulose, carboxy methyl cellulose, hydroxyethyl cellulose, hydroxypropyl cellulose, and hydroxypropyl methyl cellulose or derivatives thereof, proteins such as gelatin, casein, and glue; and water-soluble polymers such as polyvinyl alcohol, poly(meth)acrylic acid, polyether, polyvinyl pyrolidone, and polyvinyl formal. These thickening agents may be used alone or in an appropriate combination of two or more thereof. In Examples to be described later, carboxy methyl cellulose (CMC) or polyvinyl pyrolidone (PVP) is used as the thickening agent.

In the present disclosure, it is not essential to contain the thickening agent in the pretreatment liquid, and when the thickening agent is contained, a content thereof is not particularly limited. As a representative content, a lower limit of the content of the thickening agent may be 0.01% by mass or more, may be 0.05% by mass or more, or may be 0.1% by mass or more when the total amount of the pretreatment liquid containing the aggregating agent and the water as the main solvent is 100% by mass. An upper limit of the content of the thickening agent may be 5% by mass or less, may be 2% by mass or less, or may be 1% by mass or less.

When the content of the thickening agent is below the lower limit value, an operation and effect of blending the thickening agent may not be sufficiently achieved although depending on various conditions. On the other hand, when the content of the thickening agent exceeds the upper limit value, various physical properties such as a texture of a cloth material may be affected.

A method for producing the pretreatment liquid used in the present disclosure is not particularly limited, and the aggregating agent and the water, which are essential components, and the organic solvent and the thickening agent, which are suitable components, may be blended in a predetermined ratio and stirred and mixed by a known method. The pretreatment liquid may contain other known additives in addition to the aggregating agent, the water, the organic solvent, and the thickening agent.

[White Ink]

In the image forming method according to the present disclosure, as described above, the pretreatment liquid is applied to the image forming surface (printing surface) of the cloth material 30 to fix the pretreatment liquid to the cloth material 30, and then the white image is formed (printed) with the white ink. A specific configuration of the white ink used in the present disclosure is not particularly limited as long as the white ink is an aqueous ink containing a titanium oxide ($TiO_2$) pigment as the color material.

An average particle diameter (average primary particle diameter) of the titanium oxide particles is not particularly limited, but a lower limit thereof may exceed 10 nm, may be 20 nm or more, or may be 50 nm or more. On the other hand, an upper limit value of the average particle diameter of the titanium oxide particles may be 200 nm or less, may be 180 nm or less, 150 nm or less, or 120 nm or less.

When the average particle diameter of the titanium oxide particles is 10 nm or less, improvement of a precipitation property can be expected, but since a particle diameter is extremely smaller than a wavelength of visible light, Mie scattering hardly occurs. Therefore, it is considered that the white ink is almost colorless in the state of the dispersion, and the whiteness of the formed white image is significantly reduced. On the other hand, when the average particle diameter of the titanium oxide particles is 200 nm or more, a precipitation speed is high, and thus the titanium oxide particles are more easily precipitated. A representative average particle diameter of the titanium oxide particles in the present embodiment is within a range of 50 nm or more and 120 nm or less.

A method for measuring the average particle diameter of the titanium oxide particles is not particularly limited, and a known method for measuring an average particle diameter of nano-level fine particles can be suitably used, but in the present disclosure, as described in Examples to be described later, a method is used in which scattered light intensity is measured using a dynamic scattering type particle size distribution measuring device, and the average particle diameter is calculated using a photon correlation method based on the intensity.

The white ink used in the present disclosure may contain a color material other than the titanium oxide particles, for example, other white pigments, if necessary. Since the titanium oxide particles generally have a good refractive index, the titanium oxide particles can achieve good whiteness compared to other white pigments. However, from the viewpoint of forming a suitable white image as a base layer on the image forming surface of the cloth material 30, another white pigment may be blended to some extent with the titanium oxide particles. Examples of the other white pigment include zirconium oxide, zinc sulfide, zinc oxide, barium sulfate, anhydrous calcium silicate, talc, chalk, alumina white, and silica.

The solvent of the white ink used in the present disclosure may be water similarly to the pretreatment liquid described above. The water used as the solvent may be any water as long as the water has relatively high purity as described above, and examples thereof generally include ion exchanged water, ultrafilter water, reverse osmosis water, and distilled water. As described above, the water having high purity may be pure water or ultrapure water.

In the white ink used in the present disclosure, a content of the titanium oxide particles (or all the white pigments including the titanium oxide particles) is not particularly limited, but as a representative content, when a total amount of the white ink containing the titanium oxide particles and water is 100% by mass, a lower limit of the content of the titanium oxide particles may be 1.0% by mass or more, may be 3.0% by mass or more, or may be 5.0% by mass or more. Further, an upper limit of the content of the titanium oxide particles may be 20.0% by mass or less, may be 16.0% by mass or less, and may be 14.0% by mass or less.

When the content of the titanium oxide particles is less than 1.0% by mass, the white ink may become too thin, and the good white image tends not to be formed even if the white ink is applied after the pretreatment liquid is applied. On the other hand, when the content of the titanium oxide particles exceeds 20.0% by mass, the white ink may become too dark, resulting in unnecessarily high viscosity or a decrease in discharge stability from the discharge head 13.

The white ink used in the present disclosure may contain other components in addition to the titanium oxide particles and the water. Specifically, for example, the white ink may contain a water-soluble organic solvent, or may contain various additives. Examples of the additive include, but are not particularly limited to, a dispersant, a surfactant, a viscosity modifier, a defoaming agent, a preservative, a corrosion inhibitor, and a pH adjuster. A content of the other components is not particularly limited, and a content generally used in the field of an ink jet ink can be adopted.

A method for producing the white ink used in the present disclosure is not particularly limited, and similarly to the pretreatment liquid described above, the titanium oxide particles and the water, which are essential components, and the organic solvent, which is a suitable component, may be blended in a predetermined ratio and stirred and mixed by a known method.

However, since the titanium oxide particles are not dissolved in the water, as described above, the white ink is in a state of the dispersion or the suspension in which fine particles of the titanium oxide particles are dispersed in the water. Therefore, as the precipitation property of the white ink is evaluated in Examples to be described later, when the white ink is left standing, the titanium oxide particles tend to precipitate. Therefore, in the method for producing the white ink, in order to enable good redispersion of the precipitated titanium oxide particles, a production method is suitably adopted that allows the titanium oxide particles to be even better dispersed in the water.

Specifically, examples thereof include a method in which a mill base is prepared by mixing the titanium oxide particles, the water, and the other components as necessary by a known method and thoroughly stirring a mixture, and the mill base is further dispersed using a paint shaker, a ball mill, a bead mill, an attritor, a sand mill, a horizontal media mill, a colloid mill, a roll mill, a homogenizer, an ultrasonic disperser, a stirring blade stirrer, a magnetic stirrer, or the like. In this production process, whether the titanium oxide particles are well dispersed in the obtained dispersion may be checked by, for example, a laser diffraction scattering method, or the obtained dispersion may be filtered in consideration of residual secondary particles or the like which are not sufficiently dispersed.

[Base Material and Image Formation]

The base material to be subjected to the image formation in the image forming method according to the present disclosure is the cloth material as described above, and a specific type of the cloth material is not particularly limited, but representative examples thereof include a knitted fabric (knit) and a woven fabric (texture). A specific type of the knitted fabric is not particularly limited, and examples thereof include representative knitted fabrics such as plain knitting, waffle knitting, milling knitting, dappled weave, honeycomb mesh, and polyester mesh (mesh using a polyester material). A specific type of the woven fabric is not particularly limited, and examples thereof include representative woven fabrics such as plain weave, twill weave, and sateen weave.

A specific type of a fiber used for the cloth material is not particularly limited, but in the image forming method according to the present disclosure, as will be described later, suitable fibers include cotton, silk, hemp, rayon, acetate, nylon, polyester, and a mixture thereof, since at least the white image is heated to be fixed on the cloth material. In Examples to be described later, a cotton knitted fabric used for a commercially available T-shirt is used as the cloth material.

The method for forming the image on the cloth material by the ink jet method can be divided into a wet on dry method and a wet on wet method depending on the process. In the wet on dry method, the pretreatment liquid is applied to the cloth material which is the base material, the cloth material is then sufficiently dried, the white ink is applied to a region where the pretreatment liquid is applied to form the white image, and the cloth material is heated and dried to fix the white image to the cloth material. On the other hand, in the wet on wet method, the pretreatment liquid is applied to the cloth material which is the base material, the white ink is applied on the region where the pretreatment liquid is applied without sufficiently drying the cloth material (as a state in which the cloth material is not dried to the same extent as a dry state of the cloth material in the wet on dry method) to form the white image, and the cloth material is heated and dried to fix the white image and the pretreatment liquid to the cloth material.

Both the wet on dry method and the wet on wet method have different characteristics, and any method can be appropriately selected according to various conditions such as a type of the cloth material, a shape of the cloth material, a type of the formed image, and a type of the ink. In the image forming method according to the present disclosure, the wet on dry method is adopted.

The image forming method according to the present disclosure includes: the pretreatment liquid application step of applying an aqueous pretreatment liquid to the cloth material when the image is formed on the cloth material; a heating step of heating the applied pretreatment liquid; and an image forming step of forming the image by discharging the ink to the cloth material by the ink jet method after the heating step. As described above, at least the white ink containing the titanium oxide particles having an average particle diameter of more than 10 nm and 200 nm or less is used as the ink. In such a white ink, although the titanium oxide particles which are the color material have high specific gravity, the particle diameter thereof is small, making the titanium oxide particles difficult to precipitate.

When the average particle diameter of the titanium oxide particles is decreased, the precipitation speed thereof can be decreased. However, as described above, when the average particle diameter of the titanium oxide particles is 10 nm or less, the whiteness of the formed white image tends to decrease.

In the white ink used in the ink jet method, titanium oxide particles having an average particle diameter of about 300 nm are generally used in many cases. According to Stokes theorem, the precipitation speed is proportional to the square of a particle size, so the larger the particle diameter, the easier the titanium oxide particles precipitate. The titanium oxide particles having the particle diameter of about 300 nm tend to easily precipitate. Therefore, by using titanium oxide particles having an average particle diameter in a range of 10 nm to 200 nm, it is possible to prevent the precipitation of the titanium oxide particles while the whiteness is maintained.

However, when the base material to which the white ink is applied (image forming object or printing object) is the cloth material, the smaller the average particle diameter of the titanium oxide particles, the easier the titanium oxide particles penetrate into the cloth material in a thickness direction. In particular, when the average particle diameter of the titanium oxide particles is in the range of more than 10 nm and 200 nm or less, the titanium oxide particles more easily penetrate. When the titanium oxide particles are suitably aggregated on the base material, the white image having the good whiteness can be formed. Therefore, when the titanium oxide particles penetrate into the cloth material, the good white image cannot be formed.

Figure 5:
FIG. 5 is a diagram showing presence or absence of a crack that may occur in a white image formed with a white ink in the present disclosure and evaluation examples thereof.
Figure 5:
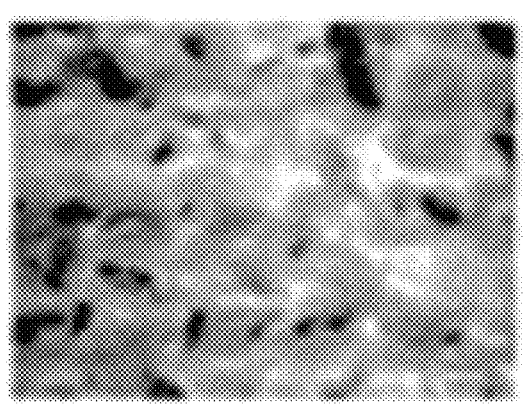
Figure 5:
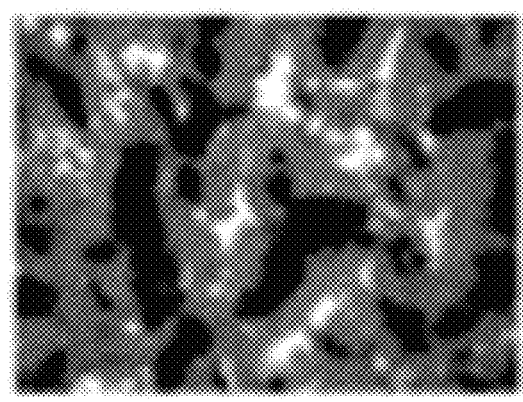

Further, it is clear that when the base material is the cloth material and the average particle diameter of the titanium oxide particles is less than 300 nm, cracks are likely to occur in the formed white image as shown in FIG. 5. When the occurrence of the cracks is increased, the image quality of the white image is significantly reduced, and thus the image quality of the color image formed on the white image is further reduced. Therefore, a state in which many cracks are visually observed as indicated by "EVALUATION C" in FIG. 5 should be avoided, and at least, it is necessary to achieve a state in which cracks are visually observed but the number of cracks is not excessive as indicated by "EVALU-ATION B" in FIG. 5.

A reason why the cracks are likely to occur in the white image is considered to be that as the average particle diameter of the titanium oxide particles becomes smaller, fluidity of the titanium oxide particles in a coating film (white image) formed on the cloth material using the white ink becomes higher. When the fluidity of the titanium oxide particles in the coating film is increased, as evaporated components such as water, which is the solvent of the white ink, evaporate, the coating film tends to shrink due to aggregation, and this shrinkage tends to cause deformation or destruction of the coating film. As a result, it is considered that the cracks are more likely to occur in the white image.

From the above-mentioned reason, it is usually assumed that the occurrence of the cracks in the ink image formed on the base material, that is, the coating film of the ink, is caused by heating and drying during fixing. Therefore, in order to avoid or prevent the cracking of the white image, it is conceivable to adjust conditions of the heating and drying such that the white ink does not dry rapidly, or to change a composition of the white ink such that rapid drying does not proceed.

However, as a result of intensive studies performed by the present inventors, as shown in Examples (particularly, Comparative Example 3) to be described later, it is clear that when the residual amount of the pretreatment liquid is too large, the crack is likely to occur. Therefore, in the image forming method according to the present disclosure, after the heating step, the pretreatment liquid is left on the cloth material, and the residual amount thereof is controlled to be less than 30 mg/cm$^2$. Accordingly, even when the white image is formed on the cloth material using the titanium oxide particles having the average particle diameter in the range of 10 nm to 200 nm, it is possible to effectively prevent the occurrence of the crack while the good whiteness is achieved.

The image forming method according to the present disclosure includes: the pretreatment liquid application step of applying at least the pretreatment liquid to the cloth material; the heating step of heating the applied pretreatment liquid; and the image forming step of forming the image on the cloth material with at least the white ink after the heating step. The method for applying the pretreatment liquid in the pretreatment liquid application step is not particularly limited, and as described above, the pretreatment liquid may be applied to the cloth material by a known pretreatment liquid application device or a known pretreatment liquid application unit.

A method for heating the pretreatment liquid in the heating step is not particularly limited, and as described above, a known method such as heat pressing can be suitably used. Here, a heating temperature in the heating step may be a temperature at which the pretreatment liquid can be suitably dried (a volatile component contained in the pretreatment liquid can be appropriately removed), and a specific temperature is not particularly limited. Typically, a lower limit of the heating temperature may be, for example, 100° C. or more, may be 110° C. or more, or may be 120° C. or more. Further, an upper limit of the heating temperature may be, for example, 180° C. or less, may be 170° C. or less, or may be 160° C. or less.

In the image forming method according to the present disclosure, the heating step of heating the pretreatment liquid applied to the cloth material may include a compression step of compressing the cloth material as described above. Accordingly, the pretreatment liquid applied to the image forming surface (printing surface) of the cloth material can be satisfactorily fixed to the cloth material. Further, by performing the compression step, it is also possible to prevent the wrinkles, the fluffing, or the like of the cloth material. The compression step may be performed as an independent step after the heating step, or may be performed simultaneously with the heating step, that is, as a heating and compression step.

In the compression step, compression pressure of the cloth material is not particularly limited, and can be appropriately set according to various conditions, and typically, a lower limit of the compression pressure may be 5 psi or more, may be 10 psi or more, or may be 15 psi or more. Further, an upper limit of the compression pressure may be 50 psi or less, may be 40 psi or less, or may be 30 psi or less. In Examples to be described later, the compression pressure is 20 psi.

Here, in the present disclosure, it is important to adjust the residual amount of the pretreatment liquid after the pretreatment liquid is applied to the cloth material and at least the heating step (or the heating step and the compression step) is performed. After the heating step, as described above, the pretreatment liquid may remain on the cloth material, an upper limit of the residual amount may be less than 30 mg/cm$^2$, and a specific lower limit of the residual amount of the pretreatment liquid is, for example, 4 mg/cm$^2$ or more. Although good aggregation depends on various conditions, as long as 4 mg/cm$^2$ or more of the pretreatment liquid remains, a pigment of the white ink applied in the image forming step can be well aggregated.

After the heating step, the residual amount of the pretreatment liquid in the cloth material may be less than 30 mg/cm$^2$ as described above, may be 22 mg/cm$^2$ or less, or may be 16 mg/cm$^2$ or less. In the present embodiment, an example of a representative residual amount of the pretreatment liquid after the heating step is a range of 4 mg/cm$^2$ or more and 16 mg/cm$^2$ or less.

In the image forming method according to the present disclosure, the residual amount of the pretreatment liquid can also be defined by a residual amount of a component contained in the pretreatment liquid. For example, when the pretreatment liquid contains the thickening agent, a residual amount of the thickening agent remaining in the cloth material may be 0.6 mg/cm$^2$ or less after the heating step.

Alternatively, in the image forming method according to the present disclosure, the polyvalent metal salt is contained as the aggregating agent, and representative examples of the polyvalent metal salt include a calcium salt or a magnesium salt as described above. In this case, after the heating step, an amount of calcium ions and magnesium ions contained in the pretreatment liquid remaining in the cloth material may be within a range of 0.02 mg/cm$^2$ to 2 mg/cm$^2$, or may be within a range of 0.05 mg/cm$^2$ to 1 mg/cm$^2$. In Examples to be described later, a residual amount of the calcium ions contained in the remaining pretreatment liquid is 0.6 mg/cm$^2$ (40 mg/cm$^2 \times 1.5\% = 0.6$ mg/cm$^2$).

In the image forming method according to the present disclosure, various conditions such as a composition of the pretreatment liquid or a heating temperature can be adjusted or set such that viscosity of the pretreatment liquid remaining in the cloth material after the heating step is a predetermined lower limit value or more. Examples of the viscosity of the pretreatment liquid remaining after the heating step include, but are not particularly limited to, 1000 mPa·s or more. Accordingly, the pretreatment liquid can be satisfactorily held on the cloth material and used for the image forming step.

A method for measuring the viscosity of the pretreatment liquid is not particularly limited, but in the present embodiment, when a rotor is at 100 rpm, the viscosity of the pretreatment liquid after being heated based on a predetermined heating condition is measured by using a rotational viscometer (manufactured by Thermo scientific, product name: HAAKE MARS, measurement cone: Cone C35/1° Ti, D=35 mm, plate: Untere Platte TMP35).

In the image forming method according to the present disclosure, as described above, since the residual amount of the pretreatment liquid is important, the application amount of the pretreatment liquid to the cloth material is not particularly limited. A representative application amount of the pretreatment liquid is, for example, within a range of 5 mg/cm$^2$ to 50 mg/cm$^2$.

A representative configuration of the image forming method according to the present disclosure is a configuration in which in the pretreatment liquid application step, the application amount of the pretreatment liquid applied to the cloth material is within a range of 5 mg/cm$^2$ to 50 mg/cm$^2$, the heating temperature in the heating step is within a range of 100° C. to 180° C., and the compression pressure of the cloth material in the compression step is within a range of 5 psi to 50 psi.

In the image forming method according to the present disclosure, the image forming step may include at least forming the white image as the base layer using the white ink, and may further include forming the color image using the color ink on the white image. Both the white image formation and the color image formation may be performed by the ink jet method.

Among these image formations, in forming the white image as the base layer, the application amount of the white ink is not particularly limited. Typically, the application amount may be within a range of 0.5 times to 10 times the residual amount of the pretreatment liquid, and may be within a range of 1 time to 5 times. When the application amount of the white ink exceeds the upper limit value, although depending on various conditions, the amount of the pretreatment liquid becomes relatively small, and components contained in the white ink cannot be aggregated, which may cause bleeding.

As described above, the image forming method according to the present disclosure may include the pretreatment liquid application step, the heating step, and the image forming step, but it goes without saying that the image forming method may also include other steps. For example, after the white image is formed first and then the color image is formed in the image forming step, a fixing step may be performed to fix these ink images to the cloth material. In the fixing step, a method of heating and fixing the cloth material on which the ink image is formed can be suitably used, but the method is not particularly limited. In this heating and fixing, for example, heat compression such as heat pressing can be performed similarly to the heating step of the pretreatment liquid described above.

As described above, the image forming method according to the present disclosure may include: the pretreatment liquid application step of applying the aqueous pretreatment liquid to the cloth material which is the absorbent base material; the heating step of heating the applied pretreatment liquid; and the image forming step of forming the image by discharging the ink to the cloth material by the ink jet method after the heating step, in which after the heating step, the pretreatment liquid remains on the cloth material, the residual amount of the pretreatment liquid is less than 30 mg/cm$^2$, and the ink contains at least the white ink containing the titanium oxide particles having the average particle diameter of more than 10 nm and 200 nm or less.

According to the above configuration, before the image is formed with the white ink, the pretreatment liquid is not sufficiently evaporated and is intentionally left to be less than 30 mg/cm$^2$. In this state, when the white ink is discharged onto the cloth material which is the absorbent base material, the titanium oxide particles which are a pigment component of the white ink can be prevented or avoided from penetrating into the cloth material in the thickness direction, and the good whiteness can be achieved. Moreover, it is possible to effectively prevent or avoid the occurrence of the crack in the white image formed after the pretreatment liquid is applied.

Since the titanium oxide particles can be aggregated on the cloth material, the titanium oxide particles having the relatively smaller average particle diameter of 200 nm or less can be used than the titanium oxide particles of about 300 nm that have been used in the white ink in the related art. It is generally known that the titanium oxide particles have the high specific gravity, and thus precipitate over time in the white ink, but by reducing the average particle diameter, the precipitation speed can be slowed down. Accordingly, it is also possible to effectively prevent clogging of the ink head.

The present disclosure also includes the image forming system capable of performing the image forming method. That is, the image forming system according to the present disclosure may include: the pretreatment liquid application unit configured to apply the aqueous pretreatment liquid to the cloth material; the heating unit configured to heat the applied pretreatment liquid; and the image forming unit configured to form the image by discharging the ink to the cloth material by the ink jet method after the heating performed by the heating unit, in which the ink contains at least the white ink containing the titanium oxide particles having the average particle diameter of more than 10 nm and 200 nm or less, and the heating unit heats the cloth material such that the residual amount of the pretreatment liquid in the cloth material after the heating is less than 30 mg/cm². The image forming system may be an image forming apparatus in which the pretreatment liquid application unit, the heating unit, and the image forming unit are integrated. Further, the present disclosure also includes the cloth material on which the image is formed by the above-described image forming method.

EXAMPLES

The present disclosure will be described more specifically based on Examples and Comparative Examples, but the present disclosure is not limited thereto. Those skilled in the art can make various changes, corrections, and modifications without departing from the scope of the present disclosure. Application conditions, and evaluation associated with the image formation in the following Examples and Comparative Examples are as follows.
(Composition of White Ink)
White inks of Examples and Comparative Examples were prepared with compositions shown in Table 1. A unit of the composition shown in Table 1 is % by mass.

TABLE 1

| | Component | Content [mass %] |
|---|---|---|
| White ink | Titanium oxide particle | 10 |
| | Resin particle (urethane resin) [Product name: ADEKA BONTIGHTER HUX564] | 15 (in terms of solid content) |
| | Glycerol (Gly) | 10 |
| | Water | Balance |

(Average Particle Diameter of Pigment for White Ink)
An average particle diameter of a titanium oxide ($TiO_2$) pigment used in the white ink was determined by diluting the titanium oxide pigment such that a concentration of the pigment was 0.1% by mass, measuring scattered light intensity with a dynamic scattering type particle size distribution measuring device (product name: LB-550, manufactured by HORIBA, Ltd.), and calculating the average particle diameter by a photon correlation method based on the measured scattered light intensity.
(Pigment Precipitation Property of White Ink)
Into a sample tube having an inner diameter of 15 mm was dispensed 10 mL of the white ink prepared in each of Examples or Comparative Examples, and the white ink was stored for one week at 25° C. and then visually evaluated for a precipitation tendency. A case in which no precipitation was visually observed was evaluated as "AA", a case in which slight precipitation was observed was evaluated as "A", a case in which precipitation was clearly visible was evaluated as "B", and a case in which a very large amount of precipitation was observed was evaluated as "C".
(Application Amount and Residual Amount of Pretreatment Liquid or White Ink)
In each of Examples and Comparative Examples, the application amount of the pretreatment liquid or the white ink or the residual amount of the pretreatment liquid was evaluated as follows. A mass of the cloth material (base material) before the application of the pretreatment liquid or before the application of the white ink was measured and defined as a reference value M0. Further, after the pretreatment liquid or the white ink was applied or after the pretreatment liquid was applied and fixed (before the white ink was applied), a mass of the cloth material was measured and defined as a measurement value M1. A subtraction value M2 (M2=M1−M0) obtained by subtracting the reference value M0 from the measurement value M1 is divided by an area Sa of the cloth material (M2/Sa). This divided value was defined as the application amount or the residual amount.
(Whiteness of White Image)
The white ink was applied to, at a concentration of 20 mg/cm², the cloth material to which the pretreatment liquid had been applied, and was heated at 100° C. for 20 minutes to fix the white ink, thereby forming a white image. Brightness L* of the white image was measured using a spectral colorimeter (product name: eXact, manufactured by X-Rite, Inc.) under conditions of a measurement field of view of 10°, a white reference Abs (absolute white), and a light source D65.
When L* was 85 or more (L*≥85), the whiteness of the white image was evaluated as "AA", when L* was 80 or more and less than 85 (80≤L*<85), the whiteness was evaluated as "A", when L* was 75 or more and less than 80 (75≤L*<80), the whiteness was evaluated as "B", and when L* was less than 75 (L*<75), the whiteness was evaluated as "C".
(Crack of White Image)
The white image formed on the cloth material in each of Examples and Comparative Examples was evaluated by visual observation and sensory test using a microscope. FIG. 5 illustrates representative states of the white image. As shown in FIG. 5, a state in which no cracks were observed visually or under the microscope in the white image (there are no cracks) was evaluated as "AA", a state in which no cracks were observed visually in the white image but cracks were observed under the microscope (there are no cracks) was evaluated as "A", a state in which cracks were observed visually in a part of the white image (there are cracks) was evaluated as "B", and a state in which considerable cracks were observed visually in the white image (cracks are excessive) was evaluated as "C", thereby evaluating the crack of the white image.

Example 1

As shown in Table 2, a pretreatment liquid according to Example 1 was prepared by blending and mixing a polyvalent metal salt, a solvent, and water. Further, as shown in Table 2, a white ink according to Example 1 was prepared with compositions shown in Table 1 by using W1 having an average particle diameter of 200 nm as the titanium oxide ($TiO_2$). A precipitation property of the titanium oxide particles in the white ink was evaluated by the above-described method. A result thereof is shown in Table 2.
In the pretreatment liquid, calcium nitrate tetrahydrate ($Ca(NO_3)_2 \cdot 4H_2O$) was used as the polyvalent metal salt, and glycerol (Gly) was used as the solvent. A unit of the composition shown in Table 2 is parts by mass, and for the polyvalent metal salt, a Ca equivalent amount (parts by mass) is also written in parentheses.
A cut piece of a commercially available plain cloth T-shirt (product name: GILDAN UltraCotton) was used as the cloth material. An evaluation sample according to Example 1 was prepared by placing this cloth material on glass, applying the pretreatment liquid in an application amount shown in Table 2, and heating the cloth material while compressing the cloth material with pressure of 20 psi to fix the pretreatment liquid on the cloth material. The fixing process was adjusted such that a residual amount of the pretreatment liquid in the evaluation sample was 10.00 mg/cm² as shown in Table 2.

Thereafter, the white ink was applied to the evaluation sample according to Example 1 by spraying in an application amount shown in Table 2 in a manner of simulating application performed by an ink jet printer, and the white ink was fixed by heating at 150° C. for 3 minutes. For a white image of the evaluation sample, whiteness and cracks were evaluated by the above-described method. Results thereof are shown in Table 2.

Examples 2 to 4

As shown in Table 2, pretreatment liquids and white inks according to Examples 2 to 4 were prepared in the same manner as in Example 1 except for the following points. A precipitation property of each of the white inks was evaluated by the above-described method. In Example 2, W2 having an average particle diameter of 150 nm was used as the titanium oxide particles. In Example 3, W3 having an average particle diameter of 120 nm was used. In Example 4, W4 having an average particle diameter of 50 nm was used. Results thereof are shown in Table 2.

By using the pretreatment liquids and the white inks according to Examples 2 to 4, evaluation samples according to Examples 2 to 4 were prepared in the same manner as in Example 1 as shown in Table 2. Whiteness and cracks of a white image in each of the evaluation samples were evaluated by the above-described method. Results thereof are shown in Table 2.

Example 5

As shown in Table 2, a pretreatment liquid and a white ink according to Example 5 were prepared in the same manner as in Example 1 except for the following points. A precipitation property of the white ink was evaluated by the above-described method. In Example 5, a content of the solvent in the pretreatment liquid was 5.0 parts by mass, and W3 having an average particle diameter of 120 nm was used as the titanium oxide particles of the white ink.

By using the pretreatment liquid and the white ink according to Example 5, an evaluation sample according to Example 5 was prepared in the same manner as in Example 1 except for the following points as shown in Table 2. In Example 5, the fixing process was adjusted such that a residual amount of the pretreatment liquid was 1 mg/cm². Whiteness and cracks of a white image in the evaluation sample were evaluated by the above-described method. Results thereof are shown in Table 2.

Examples 6 to 9

As shown in Table 2, pretreatment liquids and white inks according to Examples 6 to 9 were prepared in the same manner as in Example 5 except for the following points. A precipitation property of the white ink was evaluated by the above-described method. In Examples 6 to 9, a content of the solvent in the pretreatment liquid was 20.0 parts by mass, and was the same as in Example 1.

By using the pretreatment liquids and the white inks according to Examples 6 to 9, evaluation samples according to Examples 6 to 9 were prepared in the same manner as in Example 5 except for the following points as shown in Table 2. The fixing process was adjusted in each of Examples such that a residual amount of the pretreatment liquid was 4 mg/cm² in Example 6, a residual amount of the pretreatment liquid was 16 mg/cm² in Example 7, a residual amount of the pretreatment liquid was 22 mg/cm² in Example 8, and a residual amount of the pretreatment liquid was 28 mg/cm² in Example 9. Whiteness and cracks of a white image in each of the evaluation samples were evaluated by the above-described method. Results thereof are shown in Table 2.

Example 10

As shown in Table 2, a pretreatment liquid and a white ink according to Example 10 were prepared in the same manner as in Example 1 except for the following points. A precipitation property of the white ink was evaluated by the above-described method. In Example 10, 0.5 parts by mass of carboxy methyl cellulose (CMC) was added as a thickening agent 1 to the pretreatment liquid, and W3 having an average particle diameter of 120 nm was used as the titanium oxide particles of the white ink.

By using the pretreatment liquid and the white ink according to Example 10, an evaluation sample according to Example 10 was prepared in the same manner as in Example 1 except for the following points as shown in Table 2. In Example 10, the fixing process was adjusted such that a residual amount of the pretreatment liquid was 4 mg/cm². Whiteness and cracks of a white image in the evaluation sample were evaluated by the above-described method. Results thereof are shown in Table 2.

Examples 11 and 12

As shown in Table 2, a pretreatment liquid and a white ink according to Example 11 or 12 were prepared in the same manner as in Example 10. A precipitation property of the white ink was evaluated by the above-described method.

By using the pretreatment liquid and the white ink according to Example 11 or 12, an evaluation sample according to Example 11 or 12 was prepared in the same manner as in Example 10 except for the following points as shown in Table 2. In Example 11, the fixing process was adjusted such that a residual amount of the pretreatment liquid was 10 mg/cm². In Example 12, the fixing process was adjusted such that a residual amount of the pretreatment liquid was 14 mg/cm². Whiteness and cracks of a white image in each of the evaluation samples were evaluated by the above-described method. Results thereof are shown in Table 2.

Examples 13 and 14

As shown in Table 2, a pretreatment liquid and a white ink according to Example 13 or 14 were prepared in the same manner as in Example 11. A precipitation property of the white ink was evaluated by the above-described method. In Example 13, 1.0 parts by mass of CMC as the thickening agent 1 was added to the pretreatment liquid. In Example 14, 1.0 parts by mass of polyvinyl pyrolidone (PVP) was added as a thickening agent 2 to the pretreatment liquid.

By using the pretreatment liquid and the white ink according to Example 13 or 14, an evaluation sample according to Example 13 or 14 was prepared in the same manner as in Example 11 as shown in Table 2. Whiteness and cracks of a white image in each of the evaluation samples were evaluated by the above-described method. Results thereof are shown in Table 2.

Example 15

As shown in Table 2, a pretreatment liquid and a white ink according to Example 15 were prepared in the same manner as in Example 7. A precipitation property of the white ink was evaluated by the above-described method.

By using the pretreatment liquid and the white ink according to Example 15, an evaluation sample according to Example 15 was prepared in the same manner as in Example 7 except that no compression was performed as shown in Table 2. Whiteness and cracks of a white image in the evaluation sample were evaluated by the above-described method. Results thereof are shown in Table 2.

Comparative Example 1

As shown in Table 2, a pretreatment liquid and a white ink according to Comparative Example 1 were prepared in the same manner as in Example 1 except for the following points. A precipitation property of the white ink was evaluated by the above-described method. In Comparative Example 1, W5 having an average particle diameter of 250 nm was used as the titanium oxide particles of the white ink.

By using the pretreatment liquid and the white ink according to Comparative Example 1, an evaluation sample according to Comparative Example 1 was prepared in the same manner as in Example 1 as shown in Table 2. Whiteness and cracks of a white image in the evaluation sample were evaluated by the above-described method. Results thereof are shown in Table 2.

Comparative Example 2

As shown in Table 2, a pretreatment liquid and a white ink according to Comparative Example 2 were prepared in the same manner as in Example 1 except for the following points. A precipitation property of the white ink was evaluated by the above-described method. In Comparative Example 2, W6 having an average particle diameter of 10 nm was used as the titanium oxide particles of the white ink.

By using the pretreatment liquid and the white ink according to Comparative Example 2, an evaluation sample according to Comparative Example 2 was prepared in the same manner as in Example 1 as shown in Table 2. Whiteness and cracks of a white image in the evaluation sample were evaluated by the above-described method. Results thereof are shown in Table 2.

Comparative Example 3

As shown in Table 2, a pretreatment liquid and a white ink according to Comparative Example 3 were prepared in the same manner as in Example 1 except for the following points. A precipitation property of the white ink was evaluated by the above-described method. In Comparative Example 3, W3 having an average particle diameter of 120 nm was used as the titanium oxide particles of the white ink.

By using the pretreatment liquid and the white ink according to Comparative Example 3, an evaluation sample according to Comparative Example 3 was prepared in the same manner as in Example 1 except for the following points as shown in Table 2. In Comparative Example 3, the fixing process was adjusted such that a residual amount of the pretreatment liquid was 30 mg/cm$^2$. Whiteness and cracks of a white image in the evaluation sample were evaluated by the above-described method. Results thereof are shown in Table 2.

TABLE 2

| Component/condition/evaluation | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Pretreatment liquid | Composition [parts by mass] | Polyvalent metal salt (in terms of Ca) | 8.8 (1.5) | 8.8 (1.5) | 8.8 (1.5) | 8.8 (1.5) | 8.8 (1.5) | 8.8 (1.5) | 8.8 (1.5) | 8.8 (1.5) | 8.8 (1.5) | 8.8 (1.5) |
| | | Solvent | 20.0 | 20.0 | 20.0 | 20.0 | 5.0 | 20.0 | 20.0 | 20.0 | 20.0 | 20.0 |
| | | Thickening agent 1 | — | — | — | — | — | — | — | — | — | 0.5 |
| | | Thickening agent 2 | — | — | — | — | — | — | — | — | — | — |
| | | Water | Balance | Balance | Balance | Balance | Balance | Balance | Balance | Balance | Balance | Balance |
| | Application condition | Application amount [mg/cm$^2$] | 40 | 40 | 40 | 40 | 40 | 40 | 40 | 40 | 40 | 40 |
| | | Compression [20 psi] | Yes | Yes | Yes | Yes | Yes | Yes | Yes | Yes | Yes | Yes |
| | | Residual amount [mg/cm$^2$] | 10 | 10 | 10 | 10 | 1 | 4 | 16 | 22 | 28 | 4 |
| White ink | TiO$_2$ particle | Type | W1 | W2 | W3 | W4 | W3 | W3 | W3 | W3 | W3 | W3 |
| | | Average particle diameter [nm] | 200 | 150 | 120 | 50 | 120 | 120 | 120 | 120 | 120 | 120 |
| | Application condition | Application amount [mg/cm$^2$] | 20 | 20 | 20 | 20 | 20 | 20 | 20 | 20 | 20 | 20 |
| Evaluation | | Precipitation property | B | A | AA | AA | AA | AA | AA | AA | AA | AA |
| | | Whiteness | AA | AA | A | A | B | A | A | AA | AA | AA |
| | | Crack | AA | AA | AA | AA | AA | AA | AA | A | B | AA |

| Component/condition/evaluation | | | Example | | | | | Comparative Example | | |
|---|---|---|---|---|---|---|---|---|---|---|
| | | | 11 | 12 | 13 | 14 | 15 | 1 | 2 | 3 |
| Pretreatment liquid | Composition [parts by mass] | Polyvalent metal salt (in terms of Ca) | 8.8 (1.5) | 8.8 (1.5) | 8.8 (1.5) | 8.8 (1.5) | 8.8 (1.5) | 8.8 (1.5) | 8.8 (1.5) | 8.8 (1.5) |
| | | Solvent | 20.0 | 20.0 | 20.0 | 20.0 | 20.0 | 20.0 | 20.0 | 20.0 |
| | | Thickening agent 1 | 0.5 | 0.5 | 1.0 | — | — | — | — | — |

TABLE 2-continued

| | | | | | | | | | | | |
|---|---|---|---|---|---|---|---|---|---|---|---|
| | | Thickening agent 2 | — | — | — | 1.0 | — | — | — | — |
| | | Water | Balance | Balance | Balance | Balance | Balance | Balance | Balance | Balance |
| | Application condition | Application amount [mg/cm²] | 40 | 40 | 40 | 40 | 40 | 40 | 40 | 40 |
| | | Compression [20 psi] | Yes | Yes | Yes | Yes | Yes | Yes | Yes | Yes |
| | | Residual amount [mg/cm²] | 10 | 14 | 10 | 10 | 16 | 10 | 10 | 30 |
| White ink | TiO₂ particle | Type | W3 | W3 | W3 | W3 | W3 | W5 | W6 | W3 |
| | | Average particle diameter [nm] | 120 | 120 | 120 | 120 | 120 | 250 | 10 | 120 |
| | Application condition | Application amount [mg/cm²] | 20 | 20 | 20 | 20 | 20 | 20 | 20 | 20 |
| Evaluation | | Precipitation property | AA | AA | AA | AA | AA | C | AA | AA |
| | | Whiteness | AA | AA | AA | AA | A | AA | C | AA |
| | | Crack | AA | AA | AA | AA | A | AA | AA | C |

Comparison of Examples and Comparative Examples

As shown in Examples 1 to 15, in the image forming method according to the present disclosure, even when the white ink is prepared by using the titanium oxide particles having the average particle diameter of more than 10 nm and 200 nm or less, it is possible to achieve the good pigment precipitation property (property that the titanium oxide particles are difficult to precipitate), to achieve the good whiteness in the formed white image, and to effectively prevent the occurrence of the cracks in the white image.

In particular, as shown in Table 2, when the average particle diameter of the titanium oxide particles is within the above-described range (Examples 1 to 4), B or higher can be achieved for the pigment precipitation property, A or higher can also be achieved for the whiteness of the white image, and AA can be achieved for the cracks of the white image.

When the residual amount of the pretreatment liquid is less than the upper limit (Examples 5 to 9), B or higher can be achieved for the whiteness and the cracks of the white image. When the residual amount of the pretreatment liquid is small, the whiteness tends to be relatively low, and it is found that there is a tendency for the cracks to occur relatively easily when there is a large amount of residual pretreatment liquid.

It is found that when the thickening agent is contained in the pretreatment liquid (Examples 10 to 13), even when the residual amount of the pretreatment liquid is changed, good results are obtained in both of the whiteness and the cracks in the white image. Further, it is found that even when PVP is used as the thickening agent instead of CMC (Example 14), the good results are obtained in both of the whiteness and the cracks in the white image. Moreover, it is found that even when the cloth material is not compressed after the pretreatment liquid is applied (Example 15), sufficient results are obtained in both of the whiteness and the cracks in the white image.

On the other hand, it is found that when the average particle diameter of the titanium oxide particles is too large (Comparative Example 1), the titanium oxide particles tend to precipitate, and when the average particle diameter of the titanium oxide particles is too small (Comparative Example 2), the whiteness of the white image decreases. Further, when the residual amount of the pretreatment liquid is 30 mg/cm² (Comparative Example 3), many cracks occur in the white image, and thus the residual amount of the pretreatment liquid should be less than 30 mg/cm².

The present disclosure is not limited to the above embodiment, various changes are possible within the scope of claims, and embodiments obtained by combining technical means disclosed in the different embodiments and a plurality of variations as appropriate are also included in the technical scope of the present disclosure.

The present disclosure can be widely and suitably used in the field of an image forming method for forming an image on a cloth material such as a knitted fabric or a woven fabric by an ink jet method.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An image forming method comprising:
applying a pretreatment liquid, which is an aqueous solution, to a cloth material;
heating the applied pretreatment liquid; and
applying an ink onto the cloth material, after heating, to form an image on the cloth material by an ink jet method,
wherein after heating, the cloth material comprises the pretreatment liquid and an amount of the pretreatment liquid per unit area of the cloth material is 4 mg/cm² or more and less than 30 mg/cm², and
wherein the ink comprises a white ink comprising titanium oxide particles having an average particle diameter of more than 10 nm and 200 nm or less.

2. The image forming method according to claim 1, wherein heating comprises compressing the cloth material.

3. The image forming method according to claim 1, wherein after heating, the cloth material comprises the pretreatment liquid in an amount of 22 mg/cm² or less per unit area of the cloth material.

4. The image forming method according to claim 1, wherein after heating, the cloth material comprises the pretreatment liquid in an amount of 4 mg/cm$^2$ to 16 mg/cm$^2$ per unit area of the cloth material.

5. The image forming method according to claim 1, wherein the pretreatment liquid comprises a polyvalent metal salt.

6. The image forming method according to claim 5, wherein the polyvalent metal salt is a calcium salt and/or a magnesium salt, and wherein, after heating, a total amount of calcium ions and magnesium ions contained in the pretreatment liquid per unit area of the cloth material is 0.05 mg/cm$^2$ to 1 mg/cm$^2$.

7. The image forming method according to claim 6, wherein applying the pretreatment liquid comprises applying such that an application amount per unit area of the cloth material is 5 mg/cm$^2$ to 50 mg/cm$^2$, wherein heating comprises: compressing the cloth material under a compression pressure of 5 psi to 50 psi; and heating the pretreatment liquid at a temperature of 100° C. to 180° C.

8. The image forming method according to claim 1, wherein the titanium oxide particles have an average particle diameter of 150 nm or less.

9. The image forming method according to claim 1, wherein the titanium oxide particles have an average particle diameter of 120 nm or less.

10. The image forming method according to claim 1, wherein the titanium oxide particles have an average particle diameter of 50 nm to 120 nm.

11. The image forming method according to claim 1, wherein the pretreatment liquid comprises a thickening agent.

12. The image forming method according to claim 11, wherein after heating, a viscosity of the pretreatment liquid is 1000 mPa·s or more.

13. The image forming method according to claim 11, wherein after heating, the cloth material comprises the thickening agent in an amount of 0.6 mg/cm$^2$ or less per unit area of the cloth material.

14. An image forming system, comprising:
a pretreatment liquid application unit configured to apply a pretreatment liquid, which is an aqueous solution, to a cloth material;
a heating unit configured to heat the applied pretreatment liquid; and
an image forming unit configured to apply an ink onto the cloth material to form an image on the cloth material by an ink jet method,
wherein the ink comprises a white ink comprising titanium oxide particles having an average particle diameter of 10 nm or more and 200 nm or less, and
wherein the heating unit is configured to heat the pretreatment liquid such that the cloth material comprises the pretreatment liquid and an amount of the pretreatment liquid per unit area of the cloth material is 4 mg/cm$^2$ or more and less than 30 mg/cm$^2$, after the heating unit heats the pretreatment liquid.

15. A cloth material having an image formed thereon by the image forming method according to claim 1.

* * * * *